J. E. KENNEDY.
MEANS FOR MEASURING VIBRATION.
APPLICATION FILED MAY 3, 1920.
1,397,525.
Patented Nov. 22, 1921.
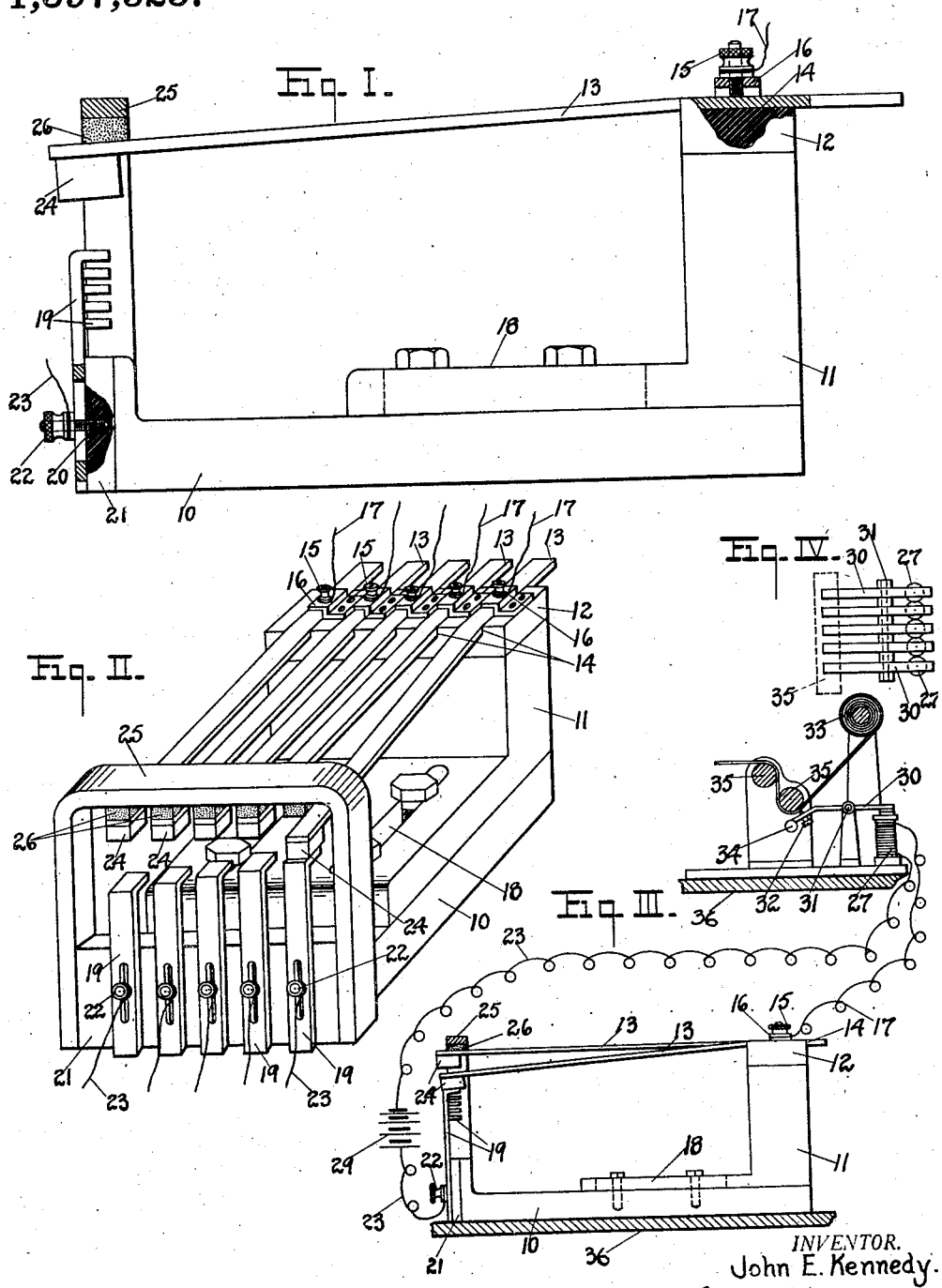
INVENTOR.
John E. Kennedy.
BY Chester W. Braselton
Harry W. Lindsey Jr.
ATTORNEYS

UNITED STATES PATENT OFFICE.

JOHN E. KENNEDY, OF GLENS FALLS, NEW YORK, ASSIGNOR TO THE WILLYS-OVERLAND COMPANY, OF TOLEDO, OHIO, A CORPORATION OF OHIO.

MEANS FOR MEASURING VIBRATION.

1,397,525.

Specification of Letters Patent.   Patented Nov. 22, 1921.

Application filed May 3, 1920. Serial No. 378,607.

*To all whom it may concern:*

Be it known that I, JOHN E. KENNEDY, residing at Glens Falls, New York, have invented certain new and useful Improvements in Means for Measuring Vibration, of which I declare the following to be a full, clear, and exact description.

This invention is intended to provide an effective means for ascertaining, recording and comparing the number and intensity of shocks or vibrations transmitted to a vehicle when passing over a given stretch of roadway at various rates of speed with different tires, springs, shock-absorbers, etc., or when subject to various service conditions. In its general aspects, the invention consists primarily in the combination of one or more vibration-receiving or shock receiving members combined with the recording mechanism for indicating the number and frequency of shocks or vibrations transmitted thereto. A further feature of the invention consists in the arrangement and combination of parts which adapt the device to indicate the relative intensity of the different shocks or vibrations to which the device is subject in the testing operations under various conditions.

These and other features of the invention will be specifically disclosed herein and will be defined in the claims annexed hereunto.

In the accompanying drawings I have illustrated a simple and convenient arrangement and construction of parts embodying the principles of the invention in which—

Figure 1 is a side elevation showing the vibration receiving or shock receiving portion of the apparatus.

Fig. 2 is a perspective view of the same.

Fig. 3 is a side elevation illustrating both the shock receiving and the recording portions of the mechanism.

Fig. 4 is a plan view showing a battery or series of vibration recording members.

In the practice of my invention according to the particular form illustrated in the drawings I provide a suitable frame work or support 10 having a vertical extension 11 surmounted by a block 12 of insulating material. Across the block 12 I provide a series of more or less flexible spring arms 13 each of which is preferably seated in suitable grooves 14 in the supporting member 12 and is clamped therein by means of a clamping screw 15 which is carried by a clip or bracket 16 which overhangs the arm or member 13 and which is secured to the support 12.

The clamping screw 15 serves as a means for adjustably holding the vibratory arms 13 in the desired position besides making it possible to shorten or lengthen the vibrating portion of the arm to vary the intensity of vibration and to permit removal of the arm for the purpose of substituting another arm that will have a greater or less degree of flexibility, in order to give the device a wide range of service. The clamping screw 15 is made in proper form to serve as a binding post to receive wires 17 for the purpose of transmitting an electric current to the recording mechanism when the circuit is closed.

As indicated in Fig. 3, the vertical portion 11 of the frame work may be adjustably secured to the bottom portion 10 by means of a screw and slot connection as shown at 18.

Secured to the front end of the frame or base, is a series of metallic strips or fingers 19 which extend upward practically in vertical alinement with the respective vibratory arms 13, with their upper ends terminating at varying distances below said arms when the latter are in position of rest, so that as each arm of the series swings downward, it will come into contact with the corresponding finger, or strip 19, in order to close an electric circuit by which the corresponding members of the recording device are controlled.

The contact fingers 19 are preferably made adjustable nearer to, or farther from their respective vibratory arms, by any suitable means, such as the set screws 20 which pass through slots in the fingers to hold them firmly and adjustably to the adjacent portion of the base, said fingers being mounted upon the insulating block 21. Each set screw 20 is provided with a head 22, to act as a clamping member or binding post and to grip a wire 23, forming an electric conductor in circuit with the recording device as shown in Fig. 3.

I prefer to provide each spring or vibration arm 13 at its free end, with a boss or weight 24 which tends to draw down the spring with a more positive action and without repeated oscillation under the impulse of each shock or vibration which serves also to prolong the period of contact for completing the circuit through said arms and the fingers 19 sufficiently to cause the apparatus to record clearly.

I also provide the frame with a stop member or bridge 25 which extends across the free ends of the vibratory arms and is preferably provided with a series of cushions 26 which may be of felt, rubber, or other yielding and non-conducting substance, so positioned as to slightly depress the arms 13 in order to keep them under constant tension so that they may normally remain at rest and will not continue to vibrate after the first downward stroke thereof.

It will also be observed as best shown in Fig. 2, that the contact fingers 19 may be positioned so that each successive finger is farther removed from its corresponding vibratory arm than the next adjacent one. This serves as a convenient arrangement by which shocks of intensity sufficient to bring the right hand arm (Fig. 2) in contact with its corresponding finger, do not act strongly enough to bring the other arms in contact with their respective fingers. Of course, a shock or jolt severe enough to cause the left hand arm to form a contact with its corresponding finger would also serve to bring all the other arms in contact with their corresponding fingers, but the less intensive shocks would cause contact only between those arms that were separated by the least distance from their contact fingers, or by those arms which are most sensitive to vibration.

Any suitable form of recording or indicating device may be employed. In this case I have shown a recording device somewhat similar in principle to the recording telegraph instrument which consists essentially of a series of electromagnets 27, whose respective coils are in circuit with the binding posts 22 and 15 through the wires 23 and 17 to which current is supplied by the battery 29. Above and in line with the electromagnets 27 is a series of parallel levers 30 pivoted on the supporting shaft 31 with their rear arms in position to be drawn into contact with the electromagnets 27. The outer ends of the levers are provided with pencils 32, so disposed as to contact with the surface of a roll of paper 33 when the rear ends of the levers are depressed by magnetic attraction. The levers adjacent the pencils are provided with weights 34 serving to quickly return the lever to normal position when the magnet 27 is deënergized. The sheet of paper 33 passes around a pair of feed rolls 35 which are movable by any suitable mechanism such as clock-work, or the like, not shown.

By adjusting the supporting standard 11 on its base 10 and correspondingly shortening or adjusting the arms 13 on the supporting block 12, the sensitiveness or the responsiveness of the same set of arms or of each arm may be substantially varied to suit the different conditions and similar effects also result from the vertical adjustment of the contact fingers 19.

If it is desired to subject any particular design of chassis, springs, or other parts of a motor vehicle to a shock or vibration test, the device may be suitably mounted thereon, so as to receive the jolts or shocks to which the vehicle is subjected. The shock actuated members and the vibration registering mechanisms are preferably mounted upon the floor 36 of the automobile to which the base frames of these devices may be secured, whereby the shock actuated members are secured to a fixed part of the body so as to be in a position to respond directly to all shocks transmitted to the vehicle. Each time that a shock of sufficient intensity to form a contact between the nearest pair of contact members 13 and 19 is transmitted to the device, the corresponding circuit will be closed, thereby bringing the corresponding pencil into contact with the recording sheet or roll, until the circuit is broken by the return movement of the vibratory arm. The relative intensity of the various shocks will be apparent from the number of pencil points that are shown to be simultaneously in contact with the recording sheet, so that by mere inspection of the sheet the number, the frequency and the relative intensity of the shocks may be ascertained, counted and compared with records made under different speeds, conditions of tires or springs or shock-absorbers, over the same road by the same or different vehicles.

What I claim as new and desire to secure by Letters Patent is:

1. The combination of a series of shock receiving and shock actuated members, a coöperating series of contact members, and a series of electrically actuated recording devices included in circuit with each pair of contact members respectively, one set of contact members being adjustable with relation to the other, in order to vary the effective action thereof.

2. The combination of a series of pairs of contact members, one of each pair being movable independently into contact with its coöperating member, said members being constructed and arranged to have varied degrees of responsiveness to transmitted shock or vibration and a series of recording devices electrically actuated and controlled by said contact members to record each contact made between its corresponding contact members.

3. The combination of a supporting frame, a series of spring arms supported thereon, a series of coöperating contact fingers arranged at different distances from their respective coöperating arms, and electrically actuated recording devices whose controlling circuits are in circuit with the respective spring arms when contact is made between the corresponding spring arms and control fingers.

4. The combination of a series of electrically operated recording devices controlled by a series of electric circuits, and a corresponding series of vibration or shock receiving members actuated by vibrations or shocks of different intensity, to close the respective circuits, in order to make a record indicative of the number and relative intensity of the vibrations or shocks received.

5. A vibration recording apparatus embracing in combination, an electrically operated recording device, a pair of normally separated contact members in circuit with said electrically operated recording device, one of said members being actuated by vibrations of a given intensity to contact with the other, in order to momentarily close said circuit and adjusting means whereby the relationship of one member to the other may be varied.

6. A multiple recording apparatus operated through a series of separate electric circuits, and a series of separate electric switch members for controlling the respective circuits, each switch being operated by vibrations of different degrees of intensity to close its own circuit, in order to record shocks of different intensity.

7. The combination of a series of recording devices, a corresponding series of vibration or shock receiving devices actuated by vibrations or shocks of different intensity and a corresponding series of connections between the recording devices and the vibration or shock receiving devices through which the recording devices are actuated under the control of the vibration or shock receiving devices in order to make a record indicative of the number and relative intensity of the vibrations or shocks received.

8. The combination of a series of shock actuated members, a corresponding series of members adapted to be engaged by the shock actuated members and adjustable relative to the shock actuated members in order to vary the effective action thereof, a series of vibration or shock recording devices actuated by vibrations or shocks of different intensity, and connections between said shock actuated members and the corresponding vibration or shock recording devices through which the recording devices are actuated under the control of the shock actuated members, in order to make a record indicative of the number and relative intensity of the vibrations or shocks received.

9. The combination of a plurality of electric circuits, a series of recording devices operatively connected with said circuits, and vibration actuated mechanism for controlling said circuits to effect progressive operation of said recording devices through vibrations of different intensity imparted to said mechanism.

10. The combination of a plurality of electric circuits, a series of recording devices operatively connected with said circuits, vibration actuated mechanism for controlling said circuits to effect progressive operation of said recording devices through vibrations of different intensity imparted to said mechanism and means controlling said mechanism whereby the intensity of said vibrations may be varied.

In testimony whereof I affix my signature.

JOHN E. KENNEDY.